United States Patent
Seack et al.

(10) Patent No.: US 10,131,418 B2
(45) Date of Patent: Nov. 20, 2018

(54) FLOW BODY WITH A LOAD INTRODUCTION ELEMENT INTEGRATED THEREIN, METHOD FOR MANUFACTURING A FLOW BODY, AND AIRCRAFT WITH SUCH A FLOW BODY

(71) Applicant: Airbus Operations GmbH, Hamburg (DE)

(72) Inventors: Oliver Seack, Hamburg (DE); Tamas Havar, Bruckmuehl (DE); Mirko Missbach, Bremen (DE); Thomas Franke, Bremen (DE)

(73) Assignee: Airbus Operations GmbH (DE)

( * ) Notice: Subject to any disclaimer, the term of this patent is extended or adjusted under 35 U.S.C. 154(b) by 95 days.

(21) Appl. No.: 14/709,652

(22) Filed: May 12, 2015

(65) Prior Publication Data

US 2015/0329197 A1    Nov. 19, 2015

(30) Foreign Application Priority Data

May 13, 2014   (DE) .................... 10 2014 106 743

(51) Int. Cl.
*B64C 3/26* (2006.01)
*B64C 3/18* (2006.01)
*B32B 37/12* (2006.01)
*B64C 9/02* (2006.01)

(52) U.S. Cl.
CPC ............... *B64C 3/26* (2013.01); *B32B 37/12* (2013.01); *B64C 3/185* (2013.01); *B64C 9/02* (2013.01); *B32B 2305/72* (2013.01); *B32B 2605/18* (2013.01); *Y02T 50/44* (2013.01); *Y10T 156/10* (2015.01)

(58) Field of Classification Search
CPC ............ B64C 9/02; B64C 3/185; B32B 37/12
USPC ............................................ 244/123.1, 123.7
See application file for complete search history.

(56) References Cited

U.S. PATENT DOCUMENTS

| | | | | |
|---|---|---|---|---|
| 5,224,670 A | * | 7/1993 | Padden | ..................... B64C 3/20 244/123.3 |
| 7,063,292 B2 | * | 6/2006 | Perez-Sanchez | ......... B64C 9/04 244/216 |
| 7,631,840 B2 | * | 12/2009 | Kallinen | ................... B64C 9/02 244/123.1 |

(Continued)

FOREIGN PATENT DOCUMENTS

DE    102008013759 A1    9/2009

OTHER PUBLICATIONS

German Search Report dated Nov. 19, 2014.

*Primary Examiner* — Brian M O'Hara
*Assistant Examiner* — Keith L Dixon
(74) *Attorney, Agent, or Firm* — Lerner, David, Littenberg, Krumholz & Mentlik, LLP (57) ABSTRACT

A flow body for an aircraft with a leading edge and a trailing edge includes a first spar, a second spar, and an external skin that spans from the leading edge to the trailing edge and on both sides rests on the spars. At least one of the first spar and the second spar includes a web and two spaced-apart flanges that enclose the web, on which flanges the skin that spans the respective spar is arranged. At least one of the first spar and the second spar includes at least one load introduction fin that forms an integral component with the web and extends outwards by way of one of the flanges and the skin that rests on the spars.

11 Claims, 4 Drawing Sheets

(56) References Cited

U.S. PATENT DOCUMENTS

| | | | | |
|---|---|---|---|---|
| 7,731,128 B2* | 6/2010 | Overbergh | ............... | B64C 9/24 |
| | | | | 244/121 |
| 8,322,657 B2* | 12/2012 | West | ........................ | B64C 3/26 |
| | | | | 244/123.1 |
| 8,453,972 B2 | 6/2013 | Billinger et al. | | |
| 9,004,405 B2* | 4/2015 | Goettinger | .............. | B64C 3/187 |
| | | | | 244/123.1 |
| 9,016,551 B2* | 4/2015 | Kirkwood | ............... | B23K 31/00 |
| | | | | 228/173.6 |
| 9,169,000 B2* | 10/2015 | Topping | .................... | B64C 9/22 |
| 9,346,534 B2* | 5/2016 | Langley | .................... | B64C 9/02 |
| 2011/0168324 A1 | 7/2011 | Ender | | |

* cited by examiner

FLOW BODY WITH A LOAD INTRODUCTION ELEMENT INTEGRATED THEREIN, METHOD FOR MANUFACTURING A FLOW BODY, AND AIRCRAFT WITH SUCH A FLOW BODY

TECHNICAL FIELD

The invention relates to a flow body with a load introduction element integrated therein, to a method for manufacturing a flow body, and to an aircraft with such a flow body.

BACKGROUND OF THE INVENTION

In order to generate lift and for flight control, aircraft comprise flow bodies that are mounted rigidly or movably. Apart from control surfaces that are movable in a purely rotatory manner, landing flaps that are movable in a translatory manner are also known, which landing flaps by way of suitable means are mechanically coupled to an actuator and are moved on a predetermined movement path. Suitable means, hereinafter also referred to as load introduction elements, are often metallic components that are associated with relatively heavy weight and for mounting to the control surface require very considerable attachment expenditure.

Flow bodies of modern aircraft are often made from fiber composite materials and may comprise two or more spars. The use of metallic load introduction elements in such an economical design for differential load introduction requires expensive mounting, because components, for example main ribs, need to be manufactured individually and joined with the use of connecting elements, which results in very considerable production costs in terms of assembly. The cost advantages of the economical manufacture of individual components are thus minimized.

BRIEF SUMMARY OF THE INVENTION

An aspect of the invention proposes a flow body that is movably held on an aircraft, which flow body may at least in part be made from a fiber composite material and comprises a load introduction element that is provided so as to be light in weight and in particular with low production costs.

Proposed is a flow body for an aircraft with a leading edge and a trailing edge, which flow body comprises a first spar, a second spar, and an external skin that spans from the leading edge to the trailing edge and on both sides rests on the spars. At least one of the first spar and the second spar in each case comprises a web and two spaced-apart flanges that enclose the web, on which flanges the skin that spans the respective spar is arranged. At least one of the first spar and the second spar comprises at least one load introduction fin that forms an integral component with the web and extends outwards by way of one of the spars and skin that rests on the spars.

The flow body is thus preferably a predominantly hollow, weight-optimized component that comprises stiffening components and a skin connected thereto. Aerodynamic forces and inertial forces that act on the flow body need to be absorbed by its mounting arrangement, which takes place by attachment to the at least one load introduction fin. The concrete embodiment of the flow body may comprise a plurality of spars or a classic spar-rib construction. The external surface, which is subjected to the airflow, is formed by the external skin and is in turn responsible, in particular, for the aerodynamic forces that are channeled into the stiffening structure as a result of its connection to the spars.

The term "spar" refers to a load-bearing element of the flow body that comprises an essentially elongated shape and is designed to absorb transverse forces and flexural moments. The cross-sectional profile with a web and two flanges that are spaced apart from each other ensures a high moment of inertia of area and at the same time a light weight of the spar. By means of it, depending on the spacing between the two flanges, very high flexural forces may be absorbed. Particularly preferably the spar comprises an I-profile contour or a double-T-profile contour, wherein as an alternative other profile contours are also imaginable, e.g. C-profiles or Z-profiles.

The shape of the external shell, which spans from the leading edge to the trailing edge, on both sides rests on the spars, and in particular is designed according to aerodynamic criteria, determines the angle of the flanges, of the particular spar, relative to each other, while the web is arranged at an angle to the two flanges and to the shell that rests on them. The web in the flow body is preferably arranged at a right angle to the flanges. If due to a local out-of parallel arrangement of the bottom and the top of the profile of the flow body this is not possible, a greater or lesser angle between the flange and the web may be provided. In this arrangement the web may, in particular, be supported perpendicularly on the underside, or, as an alternative may be arranged perpendicularly to the top of the flow body, and/or may in each case form an angle as close as possible to 90° to both flanges.

The load introduction fin of the spar in question is quasi a kind of extension of the web of the spar in question and extends in one web plane. The load introduction fin is thus itself a type of flange that is connectable to a fitting or the like outside the flow body, which flange is indirectly moved by an actuator by way of the fitting. To this effect the load introduction fin projects beyond the flange in question of the spar and the adjacent external skin towards the outside and comprises a surface that matches a fitting or some other element.

With the implementation of the load introduction fin as an integral component with the web it is possible, in an effective manner, to limit additional weight that arises as a result of the fitting of a separately manufactured load introduction fin. At the same time, because of the integral design the load introduction from the load introduction fin to the spar and thus to the flow body and vice versa is particularly effective.

In a preferred embodiment both the first spar and the second spar comprise a load introduction fin, each extending to the same side of the flow body. The spacing, for example measured along the profile extension of the flow body, between the load introduction fins supports the arrangement of a fitting between the load introduction fins so that said fitting extends between the two load introduction fins and is attached to two opposite ends or engaging around the load introduction fins. While in the case of attachment of a fitting merely to one load introduction fin the latter may be subjected to strong flexure, this may practically be avoided in the case of attachment to two load introduction fins spaced apart along the profile extension. Furthermore, in the case of the pure introduction of tractive forces and thrust forces to the load introduction fins the individual load acting on the individual load introduction fins may be reduced so that the requirements relating to the mechanical strength of the load introduction fins are reduced.

In order to additionally reduce the weight of the flow body the at least one load introduction fin may comprise a recess. Said recess may be situated in a middle region of the load introduction fin and may leave a space for implementing kinematic elements necessary for the arrangement or movement of the flow body. Apart from the arrangement of slits or other cutouts reaching into an outside edge of the load introduction fin, apertures comprising a closed aperture contour that does not make a transition to an outside edge may also be considered.

The strength of the at least one load introduction fin may be improved by an increasing width that extends from an outside edge to the skin through which the load introduction fin extends. In particular, the load introduction fin may be trapezoidal in shape with a base that adjoins the skin, a shorter edge arranged opposite, which shorter edge is preferably aligned parallel to the base, and two limbs that extend between them, which limbs are preferably arranged so as to be symmetrical.

In a particularly preferred embodiment the load introduction fin and the web have been made of a fiber composite material that comprises a fiber fabric embedded in a matrix material. The load introduction fin and the web comprise a cohesive fiber fabric that fully extends over the load introduction fin and the web. Consequently, the two sub-regions of the thus cohesive component comprise a fiber fabric that is not cut. This makes it possible to achieve a particularly homogeneous flow of forces between the load introduction fin and the web; in other words both parts are one single component.

Generally speaking a flange may comprise a fiber composite material; as an alternative to this, however, metallic materials or fiber-metal laminates are also possible so that the spar may also have a hybrid design.

The load introduction fin and the web may have been made from a metallic material. This may comprise the use of a single component that forms both the web and the load introduction fin. Furthermore, both components may be manufactured separately of each other and may be connected to each other subsequently.

It is particularly preferred if the load introduction fin and the web form a cohesive fabric that is not joined.

In an advantageous embodiment the flange through which the load introduction fin extends from the web towards the outside comprises an aperture. In this embodiment the aperture may be milled or manufactured with the use of other mechanical methods of material processing; as an alternative it may also be formed already during manufacture of a flange, for example by means of a fiber composite material.

Preferably, when the load introduction fin has been fed through it, the opening of the flange is sealed off towards the load introduction fin. This may be achieved by inserting permanently-elastic, solid, hard, or curable material wherein, as an alternative or in addition to this, a composite material at least in part covers a remaining gap between the flange and the load introduction fin, in that the composite material extends from one or several regions of the external surface and/or the internal surface of the skin, which region/s is/are adjacent to the load introduction fin, to the connecting side of the load introduction fin. Thus, for example, L-shaped reinforcement layers in a corner region or gusset region may prevent the formation of cracks that, starting from a free edge of a component in a corner region or gusset region, extend according to the load experienced. In particular, it is preferred, when the load introduction fin has been fed through, if surface transitions in the region of the aperture of the flange are lined, between the internal surface or external surface of the skin, the web and the load introduction fin, with sheets of a fiber composite material.

Particularly preferably, the web and the load introduction fin comprise a lining to form a type of internal flange which is located on an interior surface of the flange, which interior surface faces the web, through which flange the load introduction fin extends towards the outside. In this manner a safe connection between the web or the load introduction fin and the flange in question is made possible, and stress concentration in the surface transition is reduced.

In addition or as an alternative to the aforesaid, on the web in each case a reinforcement layer comprising a fiber composite material is arranged that extends from the web, in particular to the surface of the flange, which surface faces the web. Hereby a total of four edge reinforcements are provided that extend along both flanges that are spaced apart from each other. In each case on a lateral surface of the web both edge reinforcements may also make a transition into each other or may extend as a single reinforcement layer with a U-shaped cross section.

In an advantageous embodiment the fiber fabric that extends parallel to the web, starting from the flange through which the load introduction fin extends, towards the opposite flange comprises stepped lengths. This means that only some of the individual fiber fabrics extend to the flange that is situated opposite the flange through which the load introduction fin extends.

Preferably, the stepped lengths have been selected in such a manner that from the flange through which the load introduction fin extends, the web tapers off towards the opposite flange. Consequently, the composite material concentrates at the position of direct load introduction from the load introduction fin to the interior of the flow body so that adequate strength is provided at that location.

In a particularly advantageous embodiment the flow body additionally comprises a load introduction fitting that are couplable to an actuator. The load introduction fitting comprises at least one accommodation means for accommodating a load introduction fin. Particularly preferably, the load introduction fitting may comprise an articulated joint, an aperture for feeding an axle or a pin through it, a bearing or a recess that allows coupling to an actuator. In the case of coupling with the actuator, a movement of the load introduction fitting, which at least by way of at least one load introduction fin is connected to the structure of the flow body, may be carried out. If there are two load introduction fins, the load introduction fitting may, of course, comprise two accommodation means that may be made to engage both load introduction fins.

The load introduction fitting may comprise various materials. It may be advantageous to manufacture the load introduction fitting from a metallic material, in particular from a high-strength aluminum alloy, magnesium alloy, titanium or steel, wherein the profile shape of the load introduction fitting may be matched in such a manner that the lightest possible weight as a result of thin materials may be provided while nevertheless providing adequate stiffness as a result of a large moment of inertia of area in the desired directions. Of course, it is also possible to manufacture the load introduction fitting from a fiber composite material, wherein this does not exclude metallic layers being embedded therein too, for example in a fiber-metal laminate. It is also possible to use metallic inserts in some parts, for example in bearing or mounting locations.

In a particularly preferred embodiment the load introduction fitting comprises an indentation for the at least one load introduction fin, which indentation matches the shape of the load introduction fin. This indentation may engage the load introduction fin in question preferably in a tongue-like manner so that attachment means may easily be implemented. As has been explained above, pins, needles or RHEA connectors may also be used in order to establish a particularly powerful, permanent and reliable connection between the at least one load introduction fin and the load introduction fitting.

In an advantageous embodiment the load introduction fitting comprises two lateral walls that extend parallel to each other, whose planes of extension are arranged at an angle to the planes of extension of the load introduction fins. This angle may be essentially 90°; depending on the orientation of the spars in the flow body, which orientation depends, for example, on the sweep of the aircraft wing comprising the flow body, it may also differ from a sweep angle of 90° and may, for example, range from 60-120°. These two parallel lateral surfaces, which furthermore are arranged at a defined spacing relative to each other, are particularly suited to the mounting or feeding-through of pivot levers or similar, wherein exclusively symmetrical forces are introduced through the mounting arrangement into the load introduction fitting and, moreover, the lever or crank elements are freely movable around the load introduction fitting. Furthermore, this is associated with a particular advantage of a recess of an upstream load introduction fin, because in that location a lever that is mounted between the two lateral surfaces may be pivoted in or extend through if it is rigid. This makes it possible to achieve a particularly compact home position or neutral position of the flow body.

The invention furthermore relates to a method for manufacturing a flow body with the characteristics of the secondary independent claim.

The method for manufacturing a flow body may be implemented in various ways. They differ in particular by a selected concept of curing, pre-curing or pre-compacting of one or several sub-regions of the spar. Proposed is a fundamental method that comprises the steps of providing a web and the at least one load introduction fin as an integral raw component; bringing together the raw component with two flanges so that they are spaced apart from each other, encompass the web, and form an at least prefabricated spar; bringing together the at least prefabricated spar and an external skin, wherein an adhesive and/or a curable resin are/is applied between the at least prefabricated spar and the external skin; and curing the adhesive and/or the curable resin between the at least prefabricated spar and the external skin to form at least one portion of the flow body.

Providing a web and the at least one load introduction fin as a raw component may involve the pre-curing of at least one composite structure comprising a curable resin with fibers embedded therein for forming a web and the at least one load introduction fin. As an alternative or in addition to the aforesaid it would also be possible to use a raw component that is not manufactured from fiber composite materials.

In an advantageous embodiment of the method, apart from comprising the web and the load introduction fin, the pre-cured composite structure may also comprise at least one inner flange that extends essentially orthogonally from the web towards the outside and is placed onto an internal surface of the external shell. In this arrangement the at least one inner flange may be formed when the web and the load introduction fin are manufactured. As an alternative to this the at least one inner flange may be formed by inserting the pre-cured composite structure into a molding tool, by applying further layers of a fiber composite material with a fiber fabric and a curable resin, and by pre-curing the composite comprising the web, the load introduction fin and at least one inner flange.

Providing two flanges may, furthermore, involve the forming of a pre-cured composite structure in which the flanges are formed with fiber fabrics and a curable resin. Forming may take place separately of the web and of the load introduction fin, but basically also as an integral step.

In addition to this, the pre-cured composite structure may also comprise at least one reinforcement layer that extends across at least the inner flange and the web. If the pre-cured composite structure comprises flanges, the reinforcement layer may also extend over the insides of at least one flange.

Furthermore, the method may comprise the lining of surface transitions in the region of an aperture of the flange through which the at least one load introduction fin is fed, of an internal surface or external surface of the skin, the web and the load introduction fin with sheets of a fiber composite material.

Subsequently the pre-cured composite structure may be placed on the external shell, wherein an adhesive or a resin is placed between the pre-cured or pre-compacted composite structure and the external shell so that subsequently, by curing, at least part of the flow body is produced.

The spar of the flow body, which comprises a web with a load introduction fin arranged thereon, may be prefabricated separately, wherein a web with a load introduction fin integrated therein may be inserted into the spar through the aperture of the flange so as to subsequently be cured together with the other spar components.

BRIEF DESCRIPTION OF THE DRAWINGS

Further characteristics, advantages and application options of the present invention are disclosed in the following description of the exemplary embodiments and in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1A:
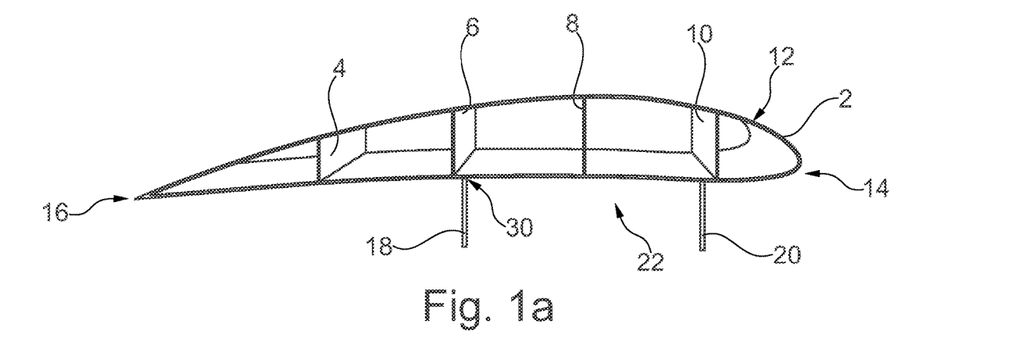
FIGS. 1a and 1b each show a flow body comprising several spars and an integrated load introduction fin in a lateral view (FIG. 1a) and in a three-dimensional view (FIG. 1b).
Figure 1B:
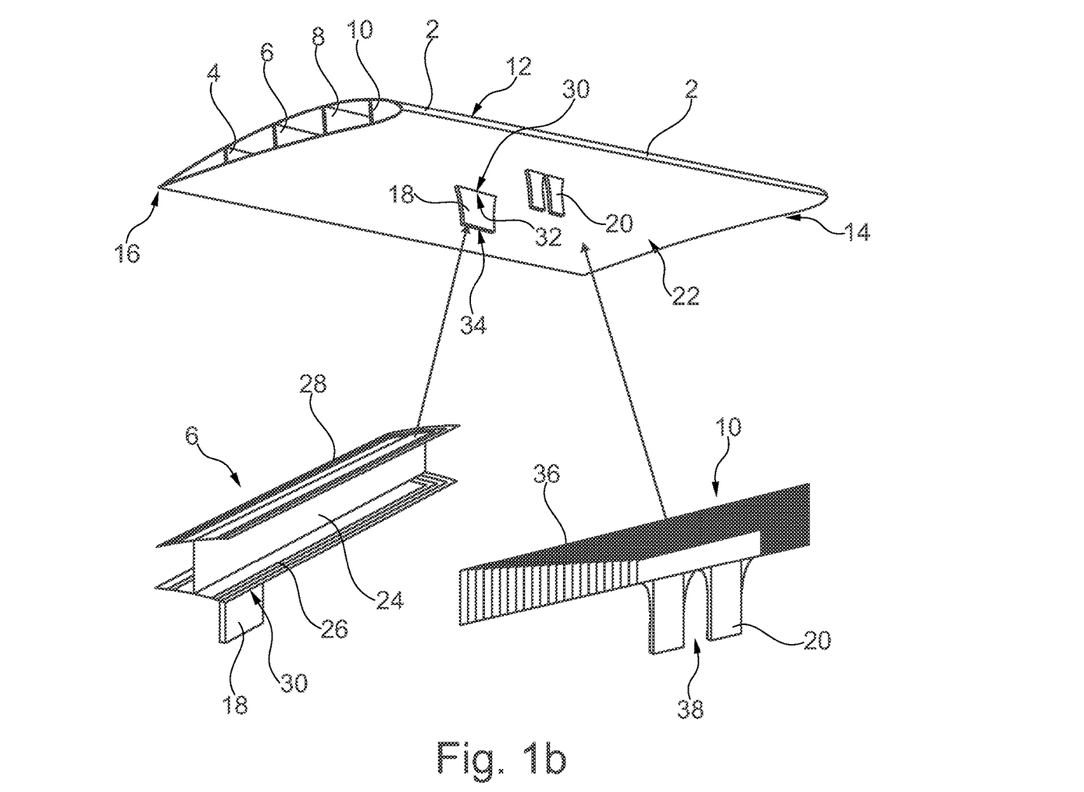

FIGS. 1a and 1b each show a flow body 2 with several parallel spars 4, 6, 8 and 10, spaced apart from each other in the direction of the profile chord, over which spars 4, 6, 8 and 10 an external skin 12 spans from a leading edge 14 to a trailing edge 16. For example, each of the spars 6 and 10 comprises a load introduction fin 18 or 20 that extends on the underside 22 of the flow body 2 over the skin 12 towards the outside in order to be connected to an external fitting (not shown in the diagram).

The two load introduction fins 18 and 20 are spaced apart from each other and make it possible to integrate, and preferably also to attach, the aforementioned fitting between facing sides of the load introduction fins 18 and 20.

In FIG. 1b the spars 6 and 10 are shown in more detail in an isolated three-dimensional view. The spar 6 comprises a web 24, a first flange 26, a second flange 28 spaced apart from the first flange 26, and the load introduction fin 18. The web 24 is designed as a sheet-like component on whose longitudinal edges the flanges 26 and 28 are symmetrically attached, and consequently the spar 6 is in the shape of an I or a double-T.

The load introduction fin 18 is quasi a local extension of the web 24 beyond the first flange 26, which extensions leads through an aperture 30 of the first flange 26. The width of extension of the load introduction fin 18, starting from the first flange 26 towards the outside, may exceed the spacing between the flanges 26 and 28.

For example, the load introduction fin 18 has a slightly trapezoidal shape, wherein a longer edge 32, i.e. the base, is provided on the first flange 26, and a shorter edge 34, spaced apart from the aforesaid, is provided on a free end of the load introduction fin 18.

The load introduction fin 20 of the front spar 10 is basically of a similar design; it makes a transition to a web 36 of the spar 10. However, the load introduction fin 20 comprises a pronounced recess 38 that is provided for the feeding-through of mechanical components for controlling the movement of the flow body 2 and/or for reducing the additional weight.

Integration of the load introduction fins 18 and 20 in the respective spar 6 or 10 may take place in several different ways which are described below in particular with the example of the rear spar 6. However, all the different concepts share a common feature in that the load introduction fin 18 or 20 and the respective associated web 24 or 36 comprise a cohesive fiber fabric that extends beyond the load introduction fin 18, 20 and the web 24, 36. This makes it possible to achieve a very homogeneous flow of forces from the load introduction fin 18 and 20 to the web 24 or 36 and vice versa. No sudden changes in load take place during the transmission, in particular, of tractive forces, between these two sub-components, because discontinuities are avoided.

Figure 2:
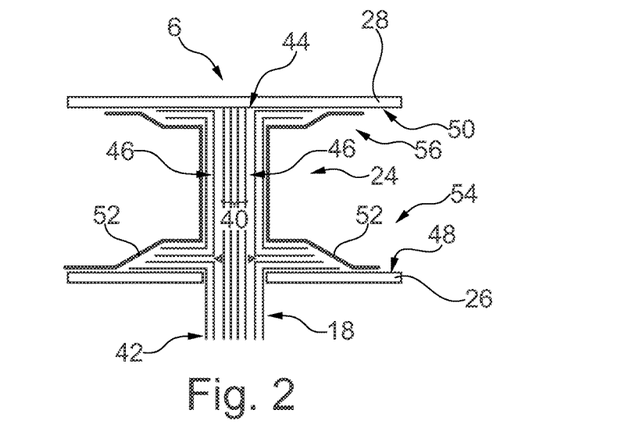
FIG. 2 shows a cross section of a spar with a load introduction fin.

FIG. 2 shows a cross section of the spar 6 made from a fiber composite material, with the fiber orientation being evident. The web 24 and the load introduction fin 18 integrated therein comprise a first fiber fabric 40 that extends from a first delimiting surface 42 to a second delimiting surface 44, thus defining the external dimensions of the web 24 and of the load introduction fin 18. The first fiber fabric 40 forms several planar layers that extend parallel to each other and form a planar laminate. Because of the lack of any structural separation between the load introduction fin 18 and the web 24 an optimal flow of forces between the aforesaid may be ensured.

For load transmission between the web 24, the load introduction fin 18 and the flanges 26 and 28 a second fiber fabric 46 is used that on the lateral surfaces of the web 24 extends parallel to the aforesaid and furthermore on internal surfaces 48 and 50 of the flanges 26 and 28 extend perpendicularly to the first fiber fabric 40. In this embodiment, individual fiber layers, starting from the internal surface 48, may extend along the first fiber fabric 40 to the opposite internal surface 50, thus forming a C-shaped reinforcement structure. The first fiber fabric 40, the second fiber fabric 46, and the connecting regions to the internal surfaces 48 and 50 may be fully covered by means of an additional, external, fiber layer 52 so that there is a homogeneous termination between the internal surfaces 48, 50 and the web 24.

For example, with increased distance of the respective internal surface 48 or 50 of the flanges 26 and 28 the second fiber fabric 46 has a somewhat smaller extension from the first fiber fabric 40 so that from the flanges 26 and 28 inwards a slightly tapering-off structure is formed. In this manner the flow of forces at the transition between the flanges 26 and 28 to the web 24 may be improved while reducing stress concentration in the boundary surfaces between the web 24 and the flanges 26 and 28.

Hereinafter, the elements that, starting from the web 24, extend outwards on the internal surfaces 48 or 50 are also referred to as internal flanges 54 and 56.

The arrangement of the first fiber fabric 40, of the second fiber fabric 46, and the external fiber layer 52 may be varied in manifold ways. FIGS. 3a to 3e show possible, but not limiting, structure layers that differ from those of FIG. 2.

Figure 3A:
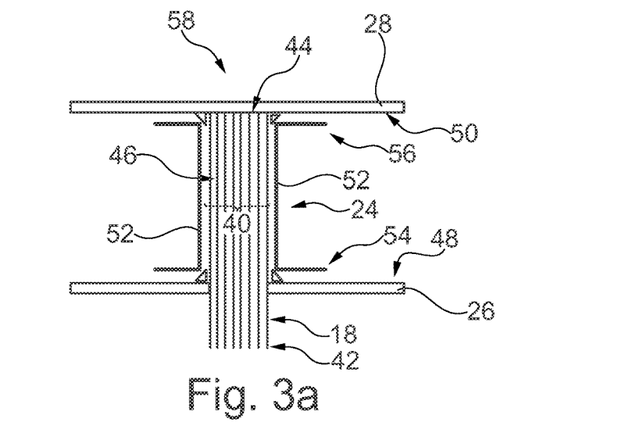
FIGS. 3a to 3e show cross sections of alternative spars, in each case with a load introduction fin.

FIG. 3a shows a particularly simple concept that comprises the planar first fiber fabric 40, previously shown in FIG. 2, between the top delimiting surface 44 and the bottom delimiting surface 42, which fiber fabric 40 is, however, somewhat thicker. This first fiber fabric 40 is terminated by the external fiber layer 52 that in each case extends in a U-shape laterally of the first fiber fabric 40 towards the outside on the internal surfaces 48 or 50 of the flanges 26 and 28.

A spar 58 formed in this manner is primarily suited to absorbing tractive forces between the web 24 and the load introduction fin 18. However, the ability to absorb thrust forces between the two flanges 26 and 28 or flexural loads in the plane of the web 24 is reduced when compared to that of the concept of FIG. 2.

Figure 3B:
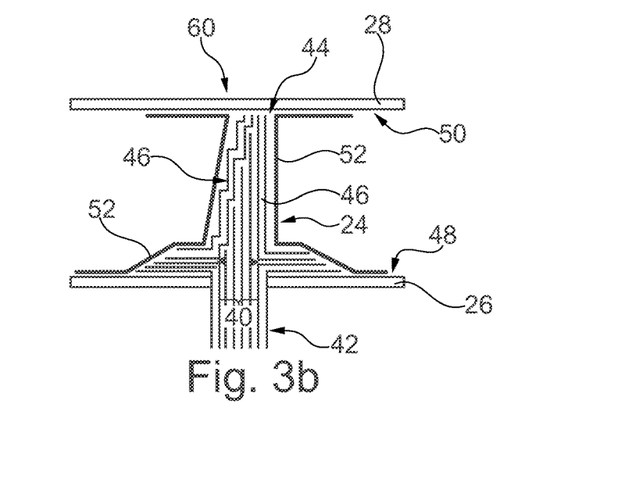

FIG. 3b shows a slight modification of the concept of FIG. 3a in the form of a spar 60. In this embodiment the first fiber fabric 40 extends with stepped longitudinal extension from the bottom end 42 to the top end 44. This means that all the fiber layers of the first fiber fabric 40 rest against the bottom end 42 while they approach the upper end 44 only step by step. For example, in this manner a slanted shape of the left-hand side (in the drawing plane) of the web 24 is achieved, while the right-hand side (in the drawing plane) of the web 24 is not slanted, as is the case in FIG. 3a.

The second fiber fabric 46 extends on the right-hand side (in the drawing plane) of the first fiber fabric 40 in a linear manner for the same distance; on the left-hand side (in the drawing plane) the second fiber fabric 46 extends in a stepped manner on the first fiber fabric 40.

In a region around the first flange 26 the second fiber fabric 46 extends orthogonally to the first fiber fabric 40 along the internal surface 48 towards the outside. However, on the second flange 28 this is not the case. In this embodiment only the external fiber layer 52 extends to the internal surface 50 of the second flange 28, on both sides of the composite structure formed by the fiber fabrics 40 and 46.

The one-sided tapering makes it possible to achieve simplified manufacture. This concept is suited, in particular, to cope with pronounced tractive loads in the direction of the load introduction fin 18.

Figure 3C:
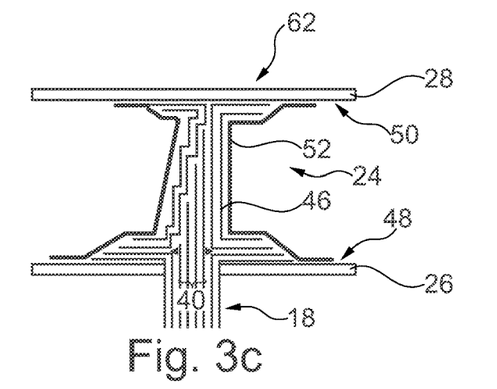

A variant of the above is shown in FIG. 3c by a spar 62, in which the web 24 comprises a fiber structure that is essentially identical to that of FIG. 3b, wherein, however, the second fiber fabric 46 also extends to the internal surface 50 of the second flange 28 and is subsequently covered up by the external fiber layer 52.

Figure 3D:
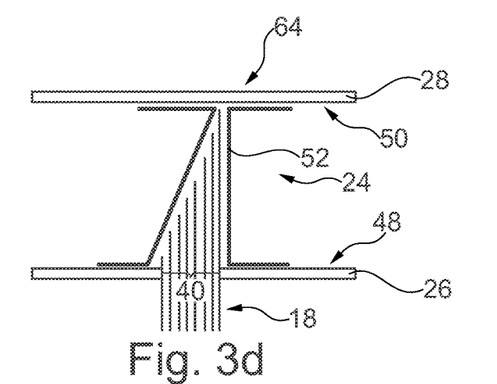

FIG. 3d shows a spar 64, as a modification of the spar 58 from FIG. 3a, in which the first fiber fabric 40 extends step by step from the first flange 26 to the second flange 28. Accordingly, there is strong tapering only on one side of the web 24. In this design, the second fiber fabric 46 is omitted. The external contour of the first fiber fabric 40 is covered by an external fiber layer 52 that extends over the internal surfaces 48 and 50 of the flanges 26 and 28.

Figure 3E:
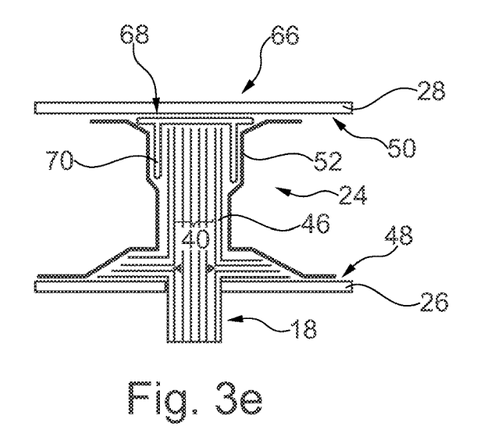

One variant when compared to the embodiment in FIG. 2 shows a spar 66 from FIG. 3e. Instead of keeping the second fiber fabric 46 on the internal surface 50 of the second flange 28, a Pi-shaped profile 68 is used which encompasses the first fiber fabric 40 and the second fiber fabric 46 on the internal surface 50 of the second flange 28 and as a result of horizontal extension by way of limbs 70 of the profile 68, which limbs 70 extend parallel to the first fiber fabric 40, provides particularly good flexural rigidity. The profile 68 may be formed from a metallic material so that the composite structure of the spar 66 is of a hybrid design. However, the profile 68 may also be manufactured from a fiber composite material.

All the concepts share a common feature in that between individual fiber layers in terminated portions of the composite structure metallic pins may be incorporated that extend orthogonally to the respective fiber fabric. As an alternative or in addition to this, so-called RHEA connectors (Redundant High-Efficiency Assembly) may be incorporated in the composite structure. They are preferably designed as sheet metal pieces or as metal fabrics comprising a plurality of needles/pins that extend orthogonally to the extension of the sheet metal or of the fabric. In this manner a very good mechanical connection, in particular for externally connected elements, is created.

Figure 4A:
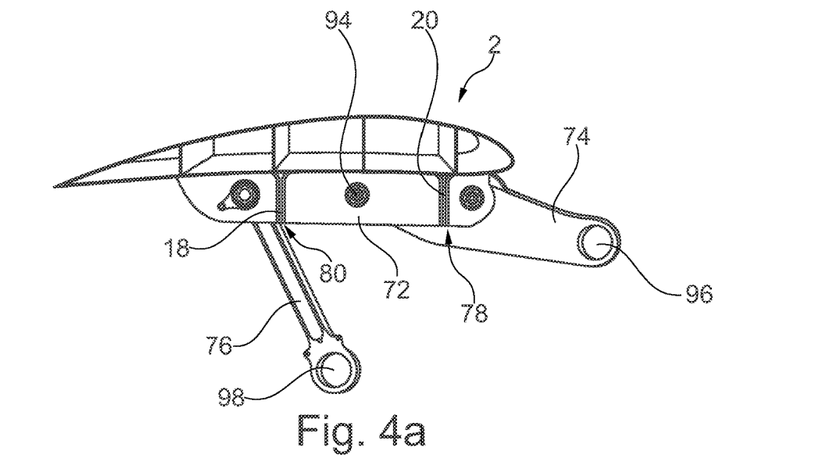
FIGS. 4a to 4c show flow bodies with load introduction fittings arranged thereon.
Figure 4B:
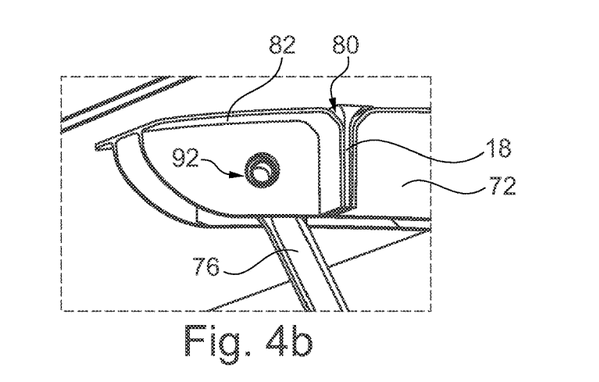
Figure 4C:
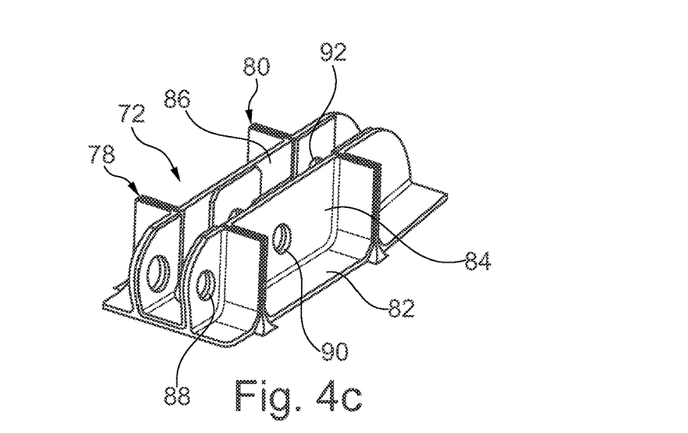

FIGS. 4a, 4b and 4c show details of the flow body 2 with a load introduction fitting 72 arranged thereon, on which load introduction fitting 72 a front lever 74 and a crank element 76 are arranged. The load introduction fitting 72 comprises a first recess 78 and a second recess 80 that match a front load introduction fin 20 and a rear load introduction fin 18. In their installed state these two load introduction fins 18 and 20 project into the recesses 80 and 78 and by means of positive fit, non-positive fit, integral fit or by the attachment of separate connecting means they may establish a rigid connection with the load introduction fitting 72.

As an alternative or in addition to the aforesaid, by way of lateral flanges 82 that project to the underside 22 of the skin 12, the load introduction fitting 72 may be riveted, bonded, or connected to said skin 12 by mutual curing or by means of other connections with non-positive fit, positive fit, or integral fit.

Essentially the load introduction fitting 72 comprises two side surfaces 84, 86 that are spaced apart from each other and extend parallel to each other, which side surfaces 84, 86 comprise apertures 88, 90 and 92 that make it possible to attach the front lever 74 or the rear crank element 76. The front lever 74 may be attached by way of the apertures 88 and 90 and bolts 94 affixed therein. With the use of two bolts 94 the orientation of the flow body 2 always follows the position of the front lever 74. Said flow body 2 may, for example, comprise a hole 96 or some other element (not shown in the diagram) for moving the lever 74.

The crank element 76 is also, by means of a pin 94, pivotally held on the rear hole 92 and may support a pivoting movement of the crank element 76 between the side surfaces 84 and 86. On a side opposite the aperture 92 the crank element comprises an aperture 98 or some other attachment means with which the crank element 76 may be firmly mounted to the structure or to a further movement element. It is imaginable that the front lever 74 on a rail-guided carriage is moved on a rail while the rear crank element 76 carries out a rotation on a point on a fixed structure with the aperture 98 so that the trailing edge 16 of the flow body 2 may be moved perpendicularly. For example, both recesses 78 and 80 comprise a gap that correspond to the recesses in the load introduction fins 18 and 20, for example in FIG. 1b the recess 38 in the load introduction fin 20.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flow body for an aircraft, the flow body with a leading edge and a trailing edge, comprising:
a first spar;
a second spar parallel to the first spar and spaced part from the first spar in a chordwise direction; and
an external skin spanning from the leading edge to the trailing edge and on both sides resting on the spars;
wherein each of the first spar and the second spar comprises a double T-profile contour in the form of a web and first and second spaced-apart flanges enclosing the web, on which flanges the skin spanning the respective spar is arranged, wherein the webs of the first and the second spars are arranged parallel to each other,
wherein the first spar and the second spar are arranged inside the flow body,
wherein the first flange is arranged at an underside of the flow body and the second flange is arranged at a side of the flow body opposite to the underside, and
wherein at least one of the first spar and the second spar comprises at least one load introduction fin forming an integral component with the web of the respective spar and extending outwards through the underside of the flow body by way of the skin and one of the flanges of the respective spar parallel to the web,
wherein the load introduction fin and the web are made of a fiber composite material comprising a fiber fabric embedded in a matrix material, and
wherein the load introduction fin and the web comprise a cohesive fiber fabric fully extending over the load introduction fin and the web.

2. The flow body of claim 1, wherein both the first spar and the second spar comprise a load introduction fin, each extending to the same side of the flow body.

3. The flow body of claim 1, further comprising a fiber fabric extending parallel to the web, starting from a flange through which the load introduction fin extends, towards the opposite flange comprises stepped lengths.

4. The flow body of claim 3, wherein the stepped lengths have been selected in such a manner that from the flange through which the load introduction fin extends, the web tapers off towards the opposite flange.

5. The flow body of claim 1, wherein the load introduction fin and the web are manufactured from a metallic material.

6. The flow body of claim 5, wherein the load introduction fin and the web form a cohesive fabric that is not joined.

7. The flow body of claim 1, wherein the flange through which the load introduction fin extends from the web towards the outside comprises an aperture.

8. The flow body of claim 7, wherein when the load introduction fin has been fed through the aperture, surface transitions in the region of the aperture of the flange are lined between an internal surface or external surface of the skin, the web and the load introduction fin, with lines of material comprising a fiber composite material.

9. The flow body of claim 1, further comprising a load introduction fitting couplable to an actuator and comprises at least one accommodation means for accommodating a load introduction fin.

10. The flow body of claim 9, wherein the at least one accommodation means is a recess that matches the shape of the load introduction fin.

11. An aircraft, comprising a fuselage and a wing and at least one flow body, movably arranged on the wing, the flow body having a leading edge and a trailing edge and comprising:
a first spar;
a second spar parallel to the first spar and spaced apart from the first spar in a chordwise direction; and
an external skin spanning from the leading edge to the trailing edge and on both sides resting on the spars;
wherein each of the first spar and the second spar comprises a double T-profile contour in the form of a web and first and second spaced-apart flanges enclosing the web, on which flanges the skin spanning the respective spar is arranged, wherein the webs of the first and second spar are arranged parallel to each other,
wherein the first spar and the second spar are arranged inside the flow body,
wherein the first flanges are arranged at an underside of the flow body and the second flanges are arranged at a side of the flow body opposite to the underside, and
wherein at least one of the first spar and the second spar comprises at least one load introduction fin forming an integral component with the web of the respective spar and extending outwards through the underside of the flow body by way of the skin and one of the flanges of the respective spar parallel to the web,
wherein the load introduction fin and the web are made of a fiber composite material comprising a fiber fabric embedded in a matrix material, and
wherein the load introduction fin and the web comprise a cohesive fiber fabric fully extending over the load introduction fin and the web.

* * * * *